United States Patent [19]

Nagler et al.

[11] Patent Number: 5,014,264

[45] Date of Patent: May 7, 1991

[54] CIRCUIT CONFIGURATION FOR TELECOMMUNICATION SWITCHING SYSTEMS, IN PARTICULAR PCM TIME DIVISION MULTIPLEX TELEPHONE SWITCHING SYSTEMS WITH A CENTRAL SWITCHING NETWORK AND PERIPHERAL SUB-SWITCHING NETWORKS CONNECTED TO IT

[75] Inventors: Werner Nagler, Hohenschaeftlarn; Ludwig Schoenauer, Sauerlach, both of Fed. Rep. of Germany

[73] Assignee: Siemens Aktiengesellschaft, Berlin and Munich, Fed. Rep. of Germany

[21] Appl. No.: 285,472

[22] Filed: Dec. 16, 1988

[30] Foreign Application Priority Data

Dec. 16, 1987 [DE] Fed. Rep. of Germany ....... 3742687

[51] Int. Cl.$^5$ ............................................. H04Q 11/04
[52] U.S. Cl. ..................................... 370/58.1; 370/16; 379/273; 340/827
[58] Field of Search .......................... 370/58, 16, 58.1; 379/269, 271, 273; 340/827, 825.01; 371/8

[56] References Cited

U.S. PATENT DOCUMENTS

| | | | |
|---|---|---|---|
| 4,499,461 | 2/1985 | Schneider | 340/825.03 |
| 4,558,444 | 12/1985 | Kennedy et al. | 370/58 |
| 4,763,316 | 8/1988 | Schaich et al. | 370/58 |

FOREIGN PATENT DOCUMENTS 1207053  7/1986  Canada .

OTHER PUBLICATIONS

Telcom Report, special issue, "EWSD Digital Switching System", vol. 4, (1981)—whole issue, pp. 1–67.
CCITT Plenary Assembly, Recommendation G.704, "Functional Characteristics of Interfaces . . . ", Oct. 8–19, 1984, pp. 69–80.

Primary Examiner—Douglas W. Olms
Attorney, Agent, or Firm—Jeffrey P. Morris; Dave Caracappa

[57] ABSTRACT

Line groups with doubled central switching network and connected via correspondingly two time division multiplex lines and having inter alia one sub-switching network and one group control system each are assigned to each other in pairs. The connection devices, which are individually assigned to the one and the other of two line groups, and which are connected via internal lines in normal operation to the sub-switching network in each instance of their own line group, can be changed over to the sub-switching network of the particular other line group. So that no connections which up to the change-over switching are already through-connected or are in the process of being set up are interrupted, internal lines which form only connection-individual message paths for voice, data, and the like, are all immediately switchable; however, of the individual associated connection-individual signaling channels only those can be changed over which belong to unoccupied internal lines as well as those via which stable connections run.

4 Claims, 2 Drawing Sheets

CIRCUIT CONFIGURATION FOR TELECOMMUNICATION SWITCHING SYSTEMS, IN PARTICULAR PCM TIME DIVISION MULTIPLEX TELEPHONE SWITCHING SYSTEMS WITH A CENTRAL SWITCHING NETWORK AND PERIPHERAL SUB-SWITCHING NETWORKS CONNECTED TO IT

The present invention relates to a circuit configuration for telecommunication switching systems, in particular pulse code modulation (PCM) time division multiplex telephone switching systems with a central switching network and peripheral sub-switching networks connected to it.

Through the Journal "Telcom Report", Vol. IV (1981), Supplement "Digitalvermittlungssystem EWSD" (EWSD digital switching system), in particular through the article beginning on page 19, PCM telephone switching systems are already known which are equipped with a multistage central processor having time division multiplex inputs and time division multiplex outputs as well as with a plurality of branch line groups functioning to connect time division multiplex interexchange trunks of which each is connected to a time division multiplex input and a time division multiplex output of the switching network, and of which each has a plurality of line units functioning to connect in each instance one time division multiplex interexchange trunk, which, in turn, is connected to a time multiplex switching device associated with the particular line group and via it can be connected to channels of the time division multiplex input corresponding to the particular line groups and the corresponding time division multiplex output of the switching network.

A channel pair always comprises a channel in the one transmission direction and a channel in the other transmission direction. One channel pair is required per connection (apart from so-called multi-channel connections). As the illustration in the journal referred to above shows, a large number of line groups per telephone switching station is provided with a switching network which, to be on the safe side, is duplicated. Each line group comprises a plurality of line units. There are line units of different kinds depending on the specific kind of the connected lead. Subscriber lines are, as a rule, analog lines, but can also be realized in PCM technology. Interexchange trunks can also be analog lines. They can, however, also be realized as PCM channels which, in known manner, are combined in PCM transmission systems into one time division multiplex line each. The cited line units are constructed differently and, specifically, in each instance corresponding to the particular technology of the subscriber and interexchange trunks to be connected and depending on whether or not analog technology or time division multiplex technology is realized. As a rule, a connection device is provided for a plurality of analog subscriber lines, for example eight. Similarly, one branch line unit is provided for a plurality of analog interexchange trunks. For each time division multiplex interexchange trunk of a PCM transmission system, as a rule, one connection device is provided. But it would be equally possible to connect to one single connection device more than one time division multiplex interexchange trunk of a PCM transmission system, for example two time division multiplex lines.

Through the natural combination of the number of channels indicated below, for example, in a single PCM transmission system, its assignment is obviously also limited to only a single direction because the particular channels must run the same way as the time division multiplex lines of this PCM transmission system. Since, likewise, due to this combining the connection of a time division multiplex line of a PCM transmission system to a branch line unit, by necessity also brings about an assignment of the particular channels to a single line unit and, hence, to a single line group, in the event that for one direction only the channels (channel pairs) of a single PCM transmission system are available upon failure of a line group, all possibilities of connections fail in the particular direction and also from the aspect of switching a whole trunk group.

In order to avoid the previously explained effect of the total failure of a trunk group due solely to the failure of a line group, it was availed until now in known cases to provide independently of each other two PCM transmission systems for each direction, and to connect the time division multiplex lines of these transmission systems to line units of two different line groups. This is costly and uneconomical particularly with small trunk groups due to the duplication of the PCM transmission system.

In order not to have to provide, in a circuit configuration of the initially indicated kind in view of the possibility of failure of a line group, duplication of a PCM transmission system for each direction, and in order to avoid in so doing that only due to the failure of a line group, i.e. the failure of the channel pairs of the particular PCM transmission system, a whole direction can or must fail, for a telephone switching system of the initially indicated known kind according to Luxembourg Patent 86.734 (corresponds in terms of content to the European Patent application 87 108 702.9 = VPA 86 P 1394) it has been provided to assign two line groups pairwise to each other and it is furthermore provided that the connection devices of each of these two line groups, which during normal operation are connected to the time division multiplex switching device of their own line group, can be switched over during emergency operation of one of the two line groups to the time division multiplex switching device of the other particular line group.

This effects that a PCM transmission system with its channels in the event of failure of the particular line group can continue to be operated. In this operation, thus, a duplicate number of channels (channel pairs) is switched via a line group, i.e. via the (in each instance) other of the two line groups assigned to each other in pairs. This does, indeed, lead to an especially heavy traffic load of the particular line group and, possibly, to an increase of path-busy occurrences; however, all connections in the process of being established via the particular channels have the same chances of succeeding. It can happen that a plurality of directions can only be operated with half the traffic handling capacity. However, connections in all traffic directions can still be established and the total failure of the primarily affected traffic direction or traffic directions is prevented. By stronger proportioning of the sub-switching networks of each of the line groups with respect to the number of the individual through-connection possibilities as well as with respect to the processing capacity of each of their peripheral control units, the traffic handling capacity can, of course, be increased again in both respects.

The invention relates to a circuit configuration for centrally controlled telecommunication switching systems, in particular of PCM technology. A central switching network is provided along with a central processor. A plurality of peripheral line groups is equipped with a sub-switching network for the external connection of interexchange trunks and/or subscriber lines and with one peripheral control unit each. In these line groups each of their sub-switching networks is connected via link lines to connections of the switching network. The line groups are each assigned to each other pairwise in twos. Within each of the same line units connected via internal lines primarily to its sub-switching network is additionally connectable to the sub-switching network of the in each instance other line group—and conversely—, whereupon for connections, which extend via a line unit of the first and via the sub-switching network of the second line group, appropriate switching signal processing as well as sub-switching network setting is carried out likewise by the control unit of this line group—and conversely—. Occupiable connection paths have one message path and one signaling path each. In this circuit configuration the central switching network functions for the individual line through-connection. The central processor functions for controlling this switching network as well as the switching signal processing required heretofore. The cited peripheral control unit is provided for switching signal reception from the cited interexchange trunks and/or subscriber lines as well as for processing switching signals as well as for the routing of switching signals to the central processor and for switching signal transmission on the cited lines. The cited link lines are provided in groups per line group and are each connected internally to the particular sub-switching network. The cited line units function for the external connection of subscriber lines and/or interexchange trunks and are connected within the particular line group via internal lines primarily to their sub-switching network. The cited line units comprise, for example, subscriber line circuits, multiple subscriber line circuits, interexchange trunks terminal circuits and the like. The cited occupiable connection paths are made available for the establishment of individual connections. An individual-connection message path functions, for example, for transmitting spoken information, data, and the like. Individual-connection signaling paths are provided for switching signals which function for establishing connections, maintaining connections, as well as for charge accounting and the like.

In a circuit configuration of the previously stated type, thus, switch-overs for each line system are provided via which these are connected in normal operation with the sub-switching network of the particular line group, but via which they are upon their activation switchable to the sub-switching network of the in each instance other line group, i.e. are simultaneously also disconnectable from that of their own line group. Therefrom results in appropriate configurations the problem that at the time of the switch-over, as a rule, already a fairly large number of connections exist, i.e. connections which are already completely through-connected from subscriber site to subscriber site, and that these connections are interrupted. This switch-over is very disturbing for the particular subscriber as well as also very work-intensive for the particular switching center because the interrupted connections are for the most part subsequently again newly established by the same subscribers. The disturbing effect for the particular subscriber consists not only in that current telephone calls are unpredictably and abruptly interrupted but also in that from such interruption also connections can be affected which may be established for purposes of data transmission, control monitoring and the like, whose forced interruption is, thus, disturbing to an exceptional extent. A subsequent reestablishment of each of the interrupted connections means, moreover, for the particular switching installation that the particular information processing as well as the central and sub-central switching device controlling the line through-connections are subjected to a transient overload of longer duration.

In order not to interrupt an existing connection in a circuit configuration of the type treated here in connection with a switch-over which becomes necessary—for whatever reasons it may be required—and so as not to have to undertake reestablishing it in connection with such a switch-over together with the indicated negative effects which not only in the particular individual switching center but also occur in all others tangential to the particular interrupted and again to be reestablished connections, it has already been suggested (German Patent Application P 37 17 387.1) that in preparation for a switch-over within each of these pairs of line groups assigned to each other, connection data of each of the particular two peripheral control units are transmitted which with respect to all individual connections existing via the assigned sub-switching networks indicate which external sub-switching network connection in each case is connected with which internal sub-switching network connection, from each of the two peripheral control units via peripheral transmission paths in each instance individual to the line group pairs to the corresponding partner control unit, and that each of the two peripheral control units in conjunction with these transmitted, and also received by it, connection data sets up individual sub-connections via the sub-switching network of the particular assigned line group in each instance between internal sub-switching network connections and external sub-switching network connections, and specifically, on the one hand, such external sub-switching network connections with which through a switch-over the line units of the particular partner line groups are connectable through the switch-over, and, on the other hand, such internal sub-switching network connections to which the line units of the particular partner line groups are connectable through this switch-over.

Likewise in this connection in similar manner it was suggested (German Patent Application P 37 17 386.3) that to each of the peripheral control systems a connection data storage is assigned in which for each through-connection, connection data are stored regarding which external sub-switching network connection is connected with its own type within the same line group or in a further line group, that on the basis of change-over preparation signals given for in each instance one pair of line groups and therein for in each instance one line group the particular two peripheral control units are blocked against new connection set-up instructions, in particular that connections are also blocked which are still in the process of being set up as well as also the peripheral control unit of the first line group the connection data stored in its connection storage transmits to the peripheral control unit of the second line group, and that the latter in conjunction with these connection data, which are preferentially placed into temporary storage in the connection storage of the second line group, establishes sub-connections via the particular sub-switching network, the central switching network, and the same or a further sub-switching network, with these sub-connections starting from such external sub-switching network connections with which through the change-over the line units of the first line group are connectable.

The last addressed suggested solution permits leaving already established connections in conjunction with and with the aid of the described change-over measures extant. In this sense these already established connections may be such which are established from subscriber site to subscriber site without the particular called subscriber having already answered, thus connections which are in the ringing phase, as also such in which the particular called subscriber has already responded in which thus the particular two subscriber sites are actually in the communication state. The suggested solutions assume however the technical facts that connections which are still in the process of being established must be interrupted, which applies also for the connection establishing state before beginning of calling, thus when the particular called subscriber has been connected to a free digit circuit without already having begun to call or is yet to be connected with such circuit. For such connections in the process of being set up to come about, sub-control system(s) and central processor take part. They are in an information exchange which may not be disturbed by change-over measures of the said type regarding individual connection. Therefore, in the cited suggested solutions, connections which are already or still in the process of being set up are not included in the change-over measures but are interrupted, i.e. triggered by the switching center so that appropriate attempts at establishing connection are started anew by the particular calling subscriber whereby the particular connection then is established from the outset via the connection paths already changed over in the stated manner.

However, so as not to have to break off a connection in the process of being established of the last addressed type, but to be able to continue the current switching operation without a transition period and as continuously as possible, and to be able to carry on the further connection set-up for the connections still in the process of being set up, so-called "transient connections", i.e. for each of these connections until their final through-connection, it was already suggested by the German Patent Application P 37 33 765.3 that the line group-internal lines leading from a connection device within one line group to its sub-switching network can be switched over singly, meaning individually for each connection, within one rerouting phase to the sub-switching network of the particular other line group, that within this rerouting phase the completion of switch-overs to those of these internal lines which are unoccupied, or become free, for example through connection release, is restricted, preferably to these as well as additionally such internal lines via which connections are through-connected whose subscribers due to the answer of the called party are completely connected with each other, or entering into connection, in particular to internal lines occupied by such connections in which the connection setup processes are, in fact, developed or have been developed, the in each instance called subscriber, however, has not yet answered, and that with the completion of the rerouting phase the connections which at this point in time are still in the process of being setup are released.

In general, the invention has set itself the task in a circuit configuration of the type stated above, on which the invention rests, of also not needing to have to break up connections which are in the process of being set up in order to continue the current switching operation as much as possible continuously and without transition periods. Measures other than the already suggested ones will be stated herewith, namely with respect to the switch-over of the internal lines in accordance with the particular progress of the individual connections. This switch-over is to be made more uniform in comparison to the previously stated suggested solution and, nevertheless, it is to be achieved that for connections in the process of being established the further connection setup can be continued to the respective final through-connection.

There are partial similarities between the invention and the already suggested configurations which have been addressed previously. The invention is characterized in that the line group-internal lines leading from a connection device within a line group to its switching network can be switched over to the switching network of the respective partner line group, and that in preparation for such a change-over each of the particular two control units outputs, on the one hand, connection data which with respect to all message path sub-connections existing via its sub-switching network indicate which external sub-switching network connection is connected to which internal sub-switching network connection from itself via peripheral transmission paths in each of the line group pairs to the corresponding partner control unit, and, on the other hand, in conjunction with such received connection data establishes individual message path sub-connections via the switching network of its own line group each time between internal sub-switching network connections and external sub-switching network connections, and specifically, on the one hand, such external sub-switching network connections with which the internal lines of the particular partner line group can be connected through the change-over. each on the other hand, such internal sub-switching network connections with which through this change-over the internal lines of the partner line group are to be connected via the last-mentioned external sub-switching network connections and message path sub-connections, and that the internal lines carry only the message paths and within a rerouting phase all are immediately changed over, that, in contrast, under the signaling paths which, in a manner known per se, lead in each instance within each line group to its control unit, only that of those connection paths which are free or become free, for example through a connection release, are similarly switched over from its own control unit to that of the partner line group, as well as further of those connection paths via which the connections between subscribers are completely connected through due to the called party having answered, as well as in particular also of those connection paths in which the processes of establishing a connection are, in fact, developed, the called party, however, has not yet answered, and that with the completion of the rerouting phase potentially at this point in time connections still in the process of being set up are released.

In the drawings FIGS. 1 and 2 illustrate an embodiment of the invention with only those components which contribute significantly to, its understanding to which, however, it is not limited.

Before the specification treats specifically the particularities essential to the embodiment of the invention, it will explain the operation mechanism of a modern telephone switching system in which the invention is applied. The description starts with known time division multiplex telephone switching systems with PCM technology as they are described in the technical literature variously and great detail, for example in the above mentioned journal "Telcom Report". Herein, starting on page 19, peripheral line groups in this telephone switching system are described. As is similarly also described in illustration 1, page 8 of the cited journal, a switching network (SN) and a central processor (CP) are provided in duplicate, denoted in FIG. 1 by "K1" and "K2" and by "ZW1" and "ZW2".

Figure 1:
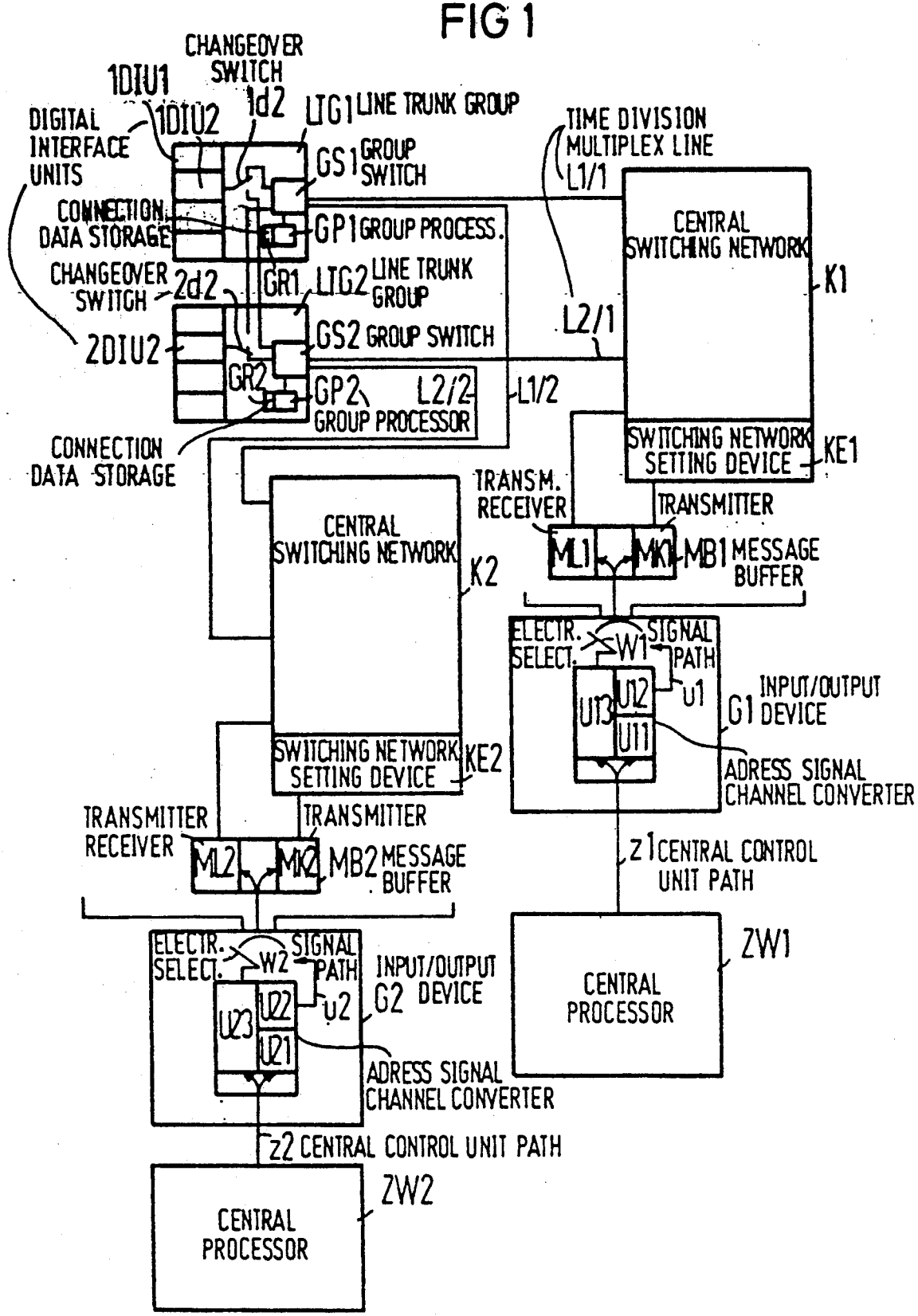
FIG. 1 is a block diagram which shows segments of a telephone switching system of the kind as is also described in German Patent 3 128 365.

In the drawings, portions of two line groups LTG1 and LTG2 are shown, which belong to a centrally controlled time division multiplex telephone switching system implemented in PCM technology according to FIG. 1. They are connected in a manner known per se via time division multiplex lines L1/1, L2/1, L1/2, and L2/2 to the multi-stage central and doubled switching network K1/K2 which has time division multiplex inputs and time division multiplex outputs according to FIG. 1. Each of these connections, corresponding to this doubling of the switching network, is a double connection. Each of these two time division multiplex lines provided for each line group, for example LTG1, has, for each of the two transmission directions, a rather large number of channels, for example thirty, and is correspondingly—as is also illustrated and described in detail in the Patent Application cited above—connected to one time division multiplex input each as well as also to a time division multiplex output of each of these two switching networks.

Further, according to FIG. 1, with each of the two parallel switching networks K1/K2 is provided central processors ZW1, ZW2 respectively, with which the entire control processing for the connection establishment are handled over the central switching networks K1, K2 respectively in a manner known per se with a buffer device MB1/MK1 or MB2/MK2 and a switching network setting unit KE1 or KE2 respectively, which is described in detail in the cited patent. To this end, data are gathered by the central processor ZW1 or ZW2 respectively (central control system) from the line groups, for example LTG1 and additional ones, as well as also output in the reverse direction to them. In the process, individual control units GP1, GP2 and additional ones of the same kind within the line groups cooperate in known manner. For this data exchange the line groups and the line units addressed in them are accessed.

Of the two central switching networks K1 and K2 and the two central processors ZW1 and ZW2, one switching network, for example K1, and one central processor, for example ZW1, are in operation at any given time. The other switching network and the other central processor are available in the event a standby configuration becomes necessary. For simplification of the further general description, therefore, for the time being only the central switching network K1 and the central processor ZW1 (thus, in each instance one) will be mentioned.

The data to be transmitted from the central processor ZW1 to the cited line groups, which may also be commands for calling up data to be transmitted from the line groups LTG1, LTG2 respectively from line units 1DIU1 to 1DIU4 to the central control system, for example numerical information, are each preceded by an address identifying the particular line unit. If one line unit is to be accessed by the central processor ZW1 for the purpose of transmitting information (possibly calling commands) from one to the other, then it transmits the address and the information successively first to an input/output device G1 (in "Telcom Report": IOP). It receives both and stores them.

As is explained in the previously cited patent, data connections exist between the I/0 device G1, on the one hand, and each of the line groups, and specifically their individual control units, for example GP1, GP2 on the other hand, via the time division multiplex lines L1/1 or L2/1 respectively, and, in particular, via one channel for each time division multiplex line, as well as via the switching network K1 and via buffer unit MB1/ML1 (of FIG. 1). If the I/0 device has received data along with the address from the central control system ZW1 via path z1, it supplies a first address part from this address (among others) to an address signal channel converter U11/U12. This first address part corresponds to the particular line group and, hence, to the data connection assigned to it via buffer device MB1 and switching network K1. The cited converter U11/U12 outputs a control datum corresponding to the first address part, which it supplies via the control path u1 to an electronic selector W1 which thereby is set to the particular signal channel (running via MB1). Thereby the I/0 device G1 is connected via it to the individual control unit, for example GP1, the particular line group, for example LTG1, and now transfers to it the information including the complete address, i.e. including the first address part.

A relatively large number of line groups functioning for connecting time division multiplex interexchange trunks assigned to different traffic directions, of which the two line groups LTG1 and LTG2 are shown as examples. The significance, the tasks, and the functions of these line groups are explained very extensively in the cited journal which in the present case are assumed to be known facts.

As already mentioned and as is also further evident in the cited journal, each of the line groups contains in each instance a plurality of line units. These function in known manner to connect subscriber lines, interexchange trunks, or transmission systems with channels which can be occupied individually in each connection. There are different kinds of line units, for example, such as for analog subscriber lines, others for digital subscriber lines, others for analog interexchange trunks and the like. Likewise there are line units which function to connect in each instance one time division multiplex interexchange trunk, which may—as is known—comprise a relatively large number of PCM channels, for example twenty-four or thirty, which can be occupied individually for each connection. As is wellknown there is precisely one channel pair for each connection, with one channel being provided for each the one transmission direction and the other transmission direction.

In the cited journal is described, further, that one line unit in analog subscriber lines or analog interexchange trunks is provided for a plurality of lines. Line units for transmission systems operated in time division multiplex which in each instance comprise a relatively large number of channel pairs (see above) are so designed that, to one line unit, a transmission system with twenty-four or thirty channel pairs is connected. In the cited journal is further described that in a line group, which is equipped with line units for time division multiplex transmission systems, a total of four or five such line units are provided. Furthermore, the cited journal states that within one line group line units are connected to a time division multiplex switching unit of the particular line group ("partial switching network") and through these can be connected to channels of the time division multiplex inputs corresponding to the particular line group and the corresponding time division multiplex output of the central switching network.

In this numerical assignment the issue (among others) is always also that the traffic loads on the different partial sections of the connection paths are optimally adapted to each other. This means practically that the number of channel pairs comprising overall the time division multiplex interexchange trunks (PCM transmission systems) connected to the line units of a line group, of which each may be assigned to another traffic direction, which, however, can also be assigned two or several in common to one and the same traffic direction, is approximately equal to the number of channel pairs which that time division multiplex line comprises which connects the particular line group to the central switching network. Thus, the transmission systems 1u1 to 1u4 in FIG. 2 may have the same number of channel pairs as the time division multiplex line L1/1.

Since it may happen that the individual control units (GP), partial switching networks (GS), or time division multiplex lines can fail due to disturbances, which hence also applies for the time division multiplex lines L1/1, L1/2, L2/1, and L2/2, this would bring about that also the time division multiplex transmission systems, which are connected to the line units of the particular line group, likewise all are no longer available for establishing a connection. Since in switching technology, given the values and data regarding the numbers of channel pairs for each traffic direction, frequently only a single transmission system for each traffic direction needs to be provided, in the event of failure of an individual control unit, a partial switching network, or a time division multiplex line connecting a line group with the central switching network, the particular sole transmission system for each traffic direction would fail. The same applies in the event of failure of the individual control unit, for example GP1, a line group, for example LTG1.

One such disadvantageous possibility is excluded through the measure that two line groups are assigned in pairs to each other. What applies in this regard for the two line groups LTG1 and LTG2, shown in FIG. 2 as examples, applies equally well for all further line groups with connection devices, to which PCM transmission systems are connected in the indicated manner. It is, furthermore, provided that the connection devices 1DIU1 to 1DIU4 and 2DIU1 to 2DIU4 of each of these two line groups LTG1 and LTG2, which are in normal operation connected to the time division multiplex switching device GS1 or GS2 of their own line group LTG1 or LTG2 respectively, during emergency operation of one of these two line groups, for example LTG2, can be switched over to one time division multiplex switching device forming a partial switching network, for example GS1, of the (in each instance) other line group, for example LTG1. To this end, change-over switches 1d1 to 1d4 and 2d1 to 2d4 are provided. These are shown in the drawing in an idle position corresponding to normal operation. Upon changing from normal operation to emergency operation they are switched from their shown idle position into their operating position. A situation of emergency operation exists, if in a line group a failure due to disturbance of the above indicated kind occurs.

If now change-over switches 2d1 to 2d4, when changing from the normal operation to the emergency operation due to disturbance, are switched from their shown idle position to their operating position, then from then on the line units 2DIU1 to 2DIU4 of the line group LTG2 are connected to the time division multiplex switching device GS1 of the line group LTG1. Consequently, in the event of a failure of the time division multiplex line L2/1 the PCM transmission systems 2u1 to 2u4 can continue to be operated with their channels which can be occupied individually with each connection.

Each of these PCM transmission systems can be assigned singly to a traffic direction. But it is also possible for two or more PCM transmission systems to be assigned to a traffic direction, which means they can also form, from the point of view of switching technology, a common trunk group of channel pairs. In the connections treated here the case assumes particular significance that for one traffic direction only single PCM transmission system with the particular number of channel pairs is provided.

As already mentioned above, the connections are put through the central switching network K1 (of FIG. 1). Here, the central processor ZW1 coordinates. In the central processor, the line groups, the line units contained within them as well as the channel pairs led through each of them, are accessible through addresses. It can be provided that each of the line units is accessible with the aid of a normal operation address as well as also with the aid of an emergency operation address from the central processor. These normal operation addresses and emergency operation addresses are thus usable depending of the particular operational requirements. Hence, it is provided that the line units which are wired with PCM transmission systems can be accessed from the central processor with one normal operation address and one emergency operation address, and that in the event of an operations failure in a line group, for example LTG2, or its group control unit, for example GP2, the emergency operation addresses of the particular line units, for example 2DIU1 to 2DIU4, which are blocked in the central processor during normal operation, are enabled and instead the normal operation addresses of these line units are blocked. In a manner not shown in detail, thus, the central processor is informed that a line group, for example LTG2, changed from normal operation into emergency operation. Due to this message the central processor undertakes the previously indicated process of enabling the emergency operation addresses of the particular line units as well as the blocking of the normal operation addresses of these line units. This applies in the same way also for access addresses of the channel pairs led through the particular line units. In this connection it is, furthermore, provided that the line units, for example 2DIU1 to 2DIU4 are accessible from the central processor with the normal operation address via its associated line group, for example LTG2, directly and with the emergency operation address via the (in each instance) other line group, for example LTG1.

In the same manner as the previously described change-over switching of the connecting paths (the entire channel pairs) with the change-over switches 2d1 to 2d4, the central clock supply of the particular line units is switched over in the transition from normal operation to emergency operation from the associated line group to the (in each instance) other line group. This ensures that the line units run clock-synchronously with that line group to which the particular switching took place. In the same manner the supply with the required operating voltage for the particular line units of those line groups which transited from normal to emergency operation can be switched over to the (in each instance) other line group. It is still more favorable to provide redundant units, which means failure-safe, for the operating voltage supply, for example double for all line units of the two line groups.

Partially deviating from the previous description, it can also be provided that the line units can be accessed from the central processor via signal channels assigned to the line groups with an address which comprises a first address part identifying the particular line group and a second address part identifying the particular line unit within it. This has already been mentioned. With the first address part of the address of the particular line unit in each instance that line group is accessed to which the particular line unit belongs. Accessing the line group takes place in the indicated manner in that in conjunction with the first address part a setting information is formed in the address signal converter U11/U12, which is supplied via the control path u to the electronic selector W1 whereby the I/0 device G1 is connected via the buffer device MB1 with that signal channel which is standing by via the switching network K1 in through-connected state, which via a time division multiplex line, for example L1/1, leads to the particular line group. Thus, an address signal channel converter G1 is provided in the central processor which in the presence of information for a line unit outputs on the basis of the address included with the information in conjunction with its first address part a signal channel number utilized by the processor for accessing the particular signal channel. This signal channel number denotes the previously cited particular signal channel. This signal channel number functions as setting information which is passed on via the signal path u1 to said electronic selector W1 for its setting to the particular signal channel. This electronic selector can be formed in any given way as coupler. The address signal channel converter G1 in the central processor ZW1 can, of course, also be provided spatially separated from it (as shown in FIG. 1), but can also be a component part of it. It functions in a manner known per se for handling the input and output procedures of the central processor ZW1 (IOP in "Telcom Report").

As already explained, in the particular access of a signal channel for the purpose of accessing the particular line group the mentioned address as well as the information is transmitted through this signal channel. Address and information are transmitted through the signal channel to the particular line group; and here via the mentioned time division multiplex switching device, for example GS1, first to the particular individual control device, for example GP1. The latter recognizes, on the basis of the address and, specifically, in particular of the second address part contained in it, on to which of the line units the particular information needs to be passed.

In the previously described connection it may initially be assumed that the first address part mentioned already above identifies that line group to which address and information were transmitted in the previously described manner. The second address part now indicates which of the line units within the particular line group, for example LTG1, is the one to which the particular information needs to be supplied. It may be assumed that this is the line unit 1DIU2. Furthermore, it may be assumed that the particular line group, for example LTG1, is in normal operating state. In this case, the change-over switch 1d2 is in the idle position shown in FIG. 1. The line unit 1DIU2 is, consequently, in this operating state connected via the idle side of the switch 1d2 to the time division multiplex switching unit GS1 of the line group LTG1.

As mentioned previously, the individual control device GP1 has received together with the information which is intended for the line unit 1DIU2 also the address and has placed it in intermediate storage, which comprises a first address part identifying the line group LTG1 and a second identifying the line unit 1DIU2 within it. On the basis of the first address part the individual control unit GP1 recognizes that the particular information is to be passed on to a line unit which belongs to the same line group LTG1. On the basis of the second address part the individual control unit recognizes that the data are to be passed on to the line unit 1DIU2. Based on this the individual control unit GP1 drives the time division multiplex switching device GS1 in such a way that a transmission path from the individual control unit GP1 to the line unit 1DIU2 is through-connected which, hence, runs via the idle side of the change-over switch 1d2.

In a modification of the previously described, it can also be provided that the individual control unit GP1 in the indicated connection also does not receive the data with the particular address but only the address itself, and that in conjunction with it through-connects a direct transmission path for the data from the signal channel extending via the time division multiplex line L1/1 via the time division multiplex switching device GS1 and the idle side of the change-over switch 1d2 to the connection device 1DIU2. In this case the address is received via the signal channel in the individual control unit GP1 and here utilized for through-connecting a direct path from the mentioned signal channel to the particular line unit. In this case, thus, placing the particular information into intermediate storage in the individual control unit GP1 would become unnecessary.

In this connection the specific emergency operation should be explained. As was already mentioned, a situation of emergency operation due to disturbance can be caused in that the signal channel between a line group and the central processor is not utilizable, or that the individual control unit, for example GP2, and/or the time division multiplex switching device, for example GS1, of the particular line group does not have the requisite functional capability. This is recognizable to the central processor on the basis of a monitoring process which is continually carried out, which is described specifically in the already mentioned journal "Telcom Report", as well as in the German patent application 3 106 903. If the central processor detects an operation disturbance which affects, for example, the line group LTG2, then the entire subsequent data exchange between central processor ZW1 and the line units 2DIU1 to 2DIU4 of the line group LTG2 affected by the operation disturbance takes place for the duration of the operation disturbance by way of line group LTG1. To this end all change-over switches in the affected line group LTG2 are brought from their idle position into their operating position in a manner described in still greater detail below. This can occur in such a way that, initially, the operating disturbance which took place within the affected line group is itself detected or that the central processor ZW1 detects the operating disturbance affecting line group LTG2; it then transmits appropriate information regarding it to the individual control unit GP1 of the line group LTG1 assigned in pairs, whereupon it outputs commands for activating the mentioned four change-over switches in the line group LTG2 to it.

Upon the occurrence of an operating disturbance affecting the line group LTG2 the change-over switches 2d1 to 2d4 are activated. Correspondingly, the line units 2DIU1 to 2DIU4 are connected with the time division multiplex switching device GS1 of line group LTG1. These change-overs occur, as will be explained below in still greater detail, according to different existing possibilities.

If the central processor ZW1 detects the functional disturbance relating to the operation disturbance of line group LTG2, hence, if it detects that the further data exchange with the corresponding line units 2DIU1 to 2DIU4 is to be handled through the signal channel of line group LTG1, it supplies a corresponding message also to the address signal converter U11/U12 in the I/0 device G1. Through this message the signal channel number relating to line units 2DIU1 to 2DIU4 in line group LTG2 is temporarily changed. This means practically that for the duration of the operation disturbance of line group LTG2 when accessing one of its line units the address signal channel converter, upon receiving an address with a first address part identifying the line group LTG2, outputs control information via the control path u1 to the electronic selector W1, which brings about that in this case, instead of the signal channel of the line group LTG2, rather the signal channel of line group LTG1 is accessed by the electronic selector W1. The central processor, hence, for accessing a line unit 2DIU1 to 2DIU4 during a state of operation disturbance outputs the address and the information for the particular line group just as in the state of normal operation of line group LTG2. In the address signal channel converter U11/U12 for the duration of the operation disturbance of line group LTG2 is retained that instead of its signal channel, rather the signal channel of line group LTG1 is to be accessed. The diversion of the information regarding the operation disturbance of line group LTG2 for its line units takes place in the I/0 device with the aid of the electronic selector W1 on the basis of the temporary change of the signal channel number stored in the address signal channel converter U11/U12, which is called up as control information from case to case and supplied for control of selector W1.

Operating situations can also arise in which, in the central processor, the actual instantaneous assignment of an interexchange trunk—or a corresponding channel—connected on the outside to a line unit to a given line group is not definitely recognized, for example during a diversion phase. For this case is provided to transmit a particular message and, specifically, one and the same message from the central processor simultaneously to the two particular line groups (LTG1 and LTG2) and, specifically, in each instance addressed in the already indicated manner. This assignment, however, is known in the line groups. That line group to which this interexchange trunk is assigned passes on this information in the described manner. Beyond that, it is provided that the other line group in which is detected that a message for an interexchange trunk has been received from the central processor, which at this time is not assigned to this line group, is determined as being irrelevant and therefore rejected. This information is, therefore, not passed from this other line group to a line unit but deleted.

If information along with an address belonging to it and consisting of a first address part and a second address part is sent due to a disturbance to line group LTG1, even though the particular information is intended for one of line units 2DIU1 to 2DIU4, then the individual control unit GP1 recognizes on the basis of the first address part initially that the particular information is intended for a line unit of the (in each instance) other line group. On the basis of the second address part this individual control unit recognizes the particular line unit for which the information is intended. Due to the first address part and due to the second address part the individual control unit GP1 carries the particular information to that line unit of the other line group LTG2 for which it is intended. To this end, the individual control unit GP1 through-connects a transmission path via the time division multiplex switching device GS1 over which the information is subsequently transmitted. This takes place via a corresponding connection of the time division multiplex switching device GS1 and the operating side of the particular change-over switch, for example 2d2. In this case, too, the particular information can be temporarily stored in the individual control unit GP1 and subsequently be transmitted from it to the particular line unit, for example 2DIU2, or it can be provided in the above described manner that in the here described operating case a direct path can also be through-connected from the signal channel extending via the time division multiplex line L1/1 via the time division multiplex switching device GS1 and via the change-over switch 2d2 in the operating position to the connection device 2DIU2.

In the manner described, information can be transmitted from the central processor to each of the line units, as well as also in the reverse direction. In the latter case, the information transmitted from the central processor to the particular line unit may be call-up information on the basis of which, in the reverse direction, the information to be transmitted and called up is transmitted from the particular connection device to the central processor. Similarly, the data transmission from line group to line group can take place as is described in the German Patent 3 128 365. In this way data can be transmitted from a line unit of a line group to a line unit of another line group and these data do not need to be received by the central processor ZW1 itself, but, after arriving from a line unit in the I/0 device G1, are transmitted from here directly to the particular connection device for which they are intended. This is possible through passing on the data within the I/0 device G1 described in the last mentioned Patent.

Before the particularities according to the invention of the described change-over switches are dealt with in greater detail, the specification will first refer to the process of doubling the processor and central switching network. As is evident in the part of the specification up to now, a central switching network K1/K2 functioning for through-connecting is provided in duplicate. Likewise, a central processor ZW1/ZW2 is provided in duplicate, with the one switching network, for example K1 and the one central processor, for example ZW1, being assigned to each other, which also applies to the other switching network and the other central processor. The central processor functions in known manner (among others) to control its central switching network as well as for the switching signal processing necessary for this purpose. Each of the two processors is program-driven in known manner. Doubling the switching network and central processor functions in known manner for stand-by operation. In the event of a functional disturbance, and/or a switching error in one of the two switching networks, and/or in one of the two central processors, and/or in one of the additional groups assigned to them, the possibility exists, as is known, that the switching operation, instead of with the one central switching network, for example K1, and the one of the two central processors, for example ZW1, is continued rather with the other of the two switching networks, for example K2, and the other of the two central processors, for example ZW2—and vice versa.

It has likewise already been explained—as is already also known from the mentioned literature references— that a plurality of individual line groups is equipped with one partial switching network for outside connection of interexchange trunks and/or subscriber lines, respectively corresponding channels, and with one individual programmable control unit for switching signal reception by these lines, for switching signal preprocessing and passing on switching signals to the particular central processor, and for switching signal transmission to the mentioned lines or channels. Thus, line group LTG1 has the partial switching network GS1 and the individual control device GP1. To the partial switching network GS1, the devices 1DIU1 to 1DIU4 are connected on the outside which were already mentioned above. On the inside the two time division multiplex lines L1/1 and L1/2 (also called link lines") are connected to the partial switching network, which lead to the two central switching networks K1 and K2. Each of these time division multiplex lines comprises—as already likewise explained earlier—a number of, for example thirty—channel pairs, with one channel pair containing a transmission channel in the one transmission direction and one transmission channel in the other transmission direction. Each of these channel pairs forms a link line. Consequently, each partial switching network, for example GS1, is group-wise separated via two groups of link lines connected, on the one hand, with switching network connections of the one and, on the other hand, of the other of the two switching networks provided parallel.

As has also already been mentioned—which is likewise evident in the literature references mentioned above—for a data exchange function for switching signal processing between the individual control units, on the one hand, and the particular processors ready to operate, on the other hand, data connections are brought into a ready state or are maintained in this state. The point of this switching signal processing is that pulse data supplied by the subscribers as well as switching signals arriving via already established or partially established connection paths which arrive via the individual line groups are supplied to the particular central processor following preprocessing in the particular individual control unit, through which the processor derives setting information for its central switching network and control information as well as switching signals which are conducted again to the particular individual control system. These switching signals are transmitted via the particular connections, and control data function (among others) to switch on audio sound signals, calling signals, and the like for the particular subscribers. The data exchange between each of the individual control systems, on the one hand, and the particular central processor, on the other, functioning for this switching signal processing, takes place via data connections which are established between each of the individual control units, on the one hand, via the particular central switching network which is in operation at any given time with the particular processor in operation and are kept continually in a ready state. These data connections are established similar to communication links via the central switching network. They extend in a manner already indicated via the devices MB1 and G1 if at the time the switching network K1 and the central processor ZW1 are in operation.

The mentioned data links between each of the individual control units of each of the line groups, on the one hand, and the central processor which is in operation at that time, function not only for the indicated data exchange carried out for handling the mentioned switching signal treatment but these data links also function for the purpose that when a central processor assumes operation and the central switching network assigned to this central processor transmits program and switching software to all individual control units of all line groups. This is also referred to as "loading" and is described extensively in the already mentioned journal "Telcom Report", supplement 1981, in the pages following page 19. To this end is provided, in the case of the presently described embodiment, an I/0 device, for example G1 connected to the central processor, for example ZW1, to which several data buffer storage devices, for example MB1 are connected; from each of these, a plurality of data links leads, via the particular switching network, for example K1, to the individual control units of the mentioned line groups. These data buffer storage devices are firmly connected singly with link connections to terminals of the switching network. As was already explained such connection and, correspondingly, also a link connection is realized through a channel pair. The channel pairs are associated with the time division multiplex lines connected to the switching network K1 or K2.

The data regarding techniques of switching which are required for switching operation and which are to be stored in the individual control units such as, for example, subscriber terminal location, subscriber call number assignment, subscriber enable, and technical features of connected interexchange trunks, and the like, as well as program information which is decisive for the handling of the switching functions, are initially input into corresponding storage devices of the two central processors and are transmitted from there, upon a central processor assuming operation, to the individual control units of the different line groups and stored there. This transmission and storage takes place individually for each line group. That means individually for the individual control units of the different line groups in succession. The time required for this utilizing an exchange is negligibly small compared to the total amount of work required in connection with establishing an exchange. This required time, however, carries greater weight in the case of stand-by switching of the central processor and the central switching network. In that event, it is also intended to load anew the individual control units of the line groups with the switching information (subscriber line software) and/or program information stored in the central processor. This ensures, for example, with certainty complete identity or complete correspondence for the cooperation of processor and control unit regarding this information, which, thus, on the one hand, are stored in the central processor which is newly going into operation and, on the other hand, in the individual control units. Hereby, any deviations are eliminated which otherwise could originate regarding this switching information and/or this program information, which, hence, on the one hand, are stored in the central processor commencing operation and, on the other hand, in the individual control units of each of the different line groups. Such deviations could arise due to errors or due to disturbances or also, for example, in that in the interim, changes of this switching information and/or program information are made intentionally. By renewed loading of all individual control units with the program data and the switching data by the central processor, in connection with which, the provided replacement switching is in the process of going into operation, such deviations are eliminated with certainty; equally, in this manner intentional changes regarding this information and program data can be carried out.

It is not only to avoid failure of a traffic direction given by a PCM transmission system (as described above) but also the additional purpose, specifically to shorten the process of the described loading of the program data and the switching information from the central processor which is in the process of taking up operation anew in connection with a provided change-over to standby—respectively from its particular storage device into the individual control units of the different line groups that the already mentioned measure functions that two line groups each are assigned to each other in pairs and that in each of them, line units functioning for the outside connection of subscriber and/or interexchange trunks and, within the particular line group connected with its partial switching network in normal operation in the event of emergency operation or in quasi-emergency operation (preparation for a processor change-over to standby), can be changed over in the described manner. Hence, use is made of the technical method described already above in detail, where the described change-over from normal operation to emergency operation can be initiated not only with a pair of line groups but (in quasi-emergency operation for preparation to a processor change-over) also possible with all line groups. In the process, the line units of one o two line groups assigned pairwise to each other are additionally connected to the partial switching network of the (in each instance) other, thus, a partner line group, which takes place equally for all line groups assigned pairwise to each other. Further, for the connections running via the changed over line units, the corresponding switching signal processing, as well as setting of the partial switching network, is also carried out by the individual control units of the partner line groups.

In this operating mode, thus, within two line groups assigned pairwise to each, the individual control unit of only one of them handles all line units, such as for example subscriber line circuits, multiple subscriber line circuits, interexchange trunk terminal circuits, which may also be interexchange trunk multiple terminal circuits and the like. All connections, too, which are established via the line units of both line groups, are through-connected via the partial switching network of only the one of the two line groups by this one control unit. Assuming that, in this operating mode, the line units of the one of these two line groups are connected to the partial switching network of the (in each instance) other line group, the entire formation of the connection, thus, takes place via the partial switching network of the latter line group with the aid of its individual control unit. The two line groups, however, are actually entirely equivalent; that means this change-over can, with respect to these two line groups, also take place in reverse. The entire further operation then takes place in the same manner as in the emergency operation mode which had earlier been described in detail. In this operating mode all line groups operate equally in emergency operation.

After bringing about the state of emergency operation one half of all individual control units are withdrawn from switching operation, likewise also one half of all partial switching networks, and, specifically, one individual control unit and the partial switching network for each pair of line groups assigned to it.

Changing over to standby of one of the two central processors by the (in each instance) other central processor is prepared while the central processor which was initially in operation until then still continues to operate in that all line groups assigned pairwise to each other are converted from normal to emergency operation; further, the other central processor establishes data links via the other central switching network associated with it to the individual control units of all first (see above!) line groups. This takes place in the manner already described above. These connections are put through to the individual control units of all those line groups whose line units were switched over to the sub-switching network of the other line unit assigned pairwise, thus, those line groups whose individual control units and whose sub-switching networks were withdrawn from normal switching operation in connection with the change-over to standby in preparation.

Via the previously described newly established data links, the central processor newly entering operation in connection with the impending change-over to standby loads the entire switching data into the particular individual control units or into their corresponding storage devices. This central processor transfers, subsequently, sequentially to the particular individual control units, which at this time have been withdrawn from regular switching operation, the program and switching software required for their renewed operation beginning for the purpose of storing it in them. This takes place by the central processor commencing operation in connection with the impending change-over to standby already preparatory during a transition time in which the other central processor still continues the switching operation with those individual control units and sub-switching networks, which have been changed from normal to emergency operation for this purpose, for the purpose of preparation of the intended change-over. Once the previously described processes of loading program information and switching information which prepare for a processor change-over to standby operation are completed, the change-over to standby operation takes place. In this process, in a manner known per se, the totality of the central data processing and control functions is transferred from the one central processor to the other central processor and the one central switching network is also replaced by the other central switching network. The change-over switches LH1 and LH2 are actuated, that is they are brought from their shown idle position to their operating position whereby the change-over from the one central switching network to the other is accomplished. It may be provided here that already existing connections remain in existence until their release. All new connections are then established with the newly loaded individual control units, and, specifically, through the sub-switching networks corresponding to them. The other individual control units and the sub-switching networks assigned to them are temporarily not used to establish further connections.

Figure 2:
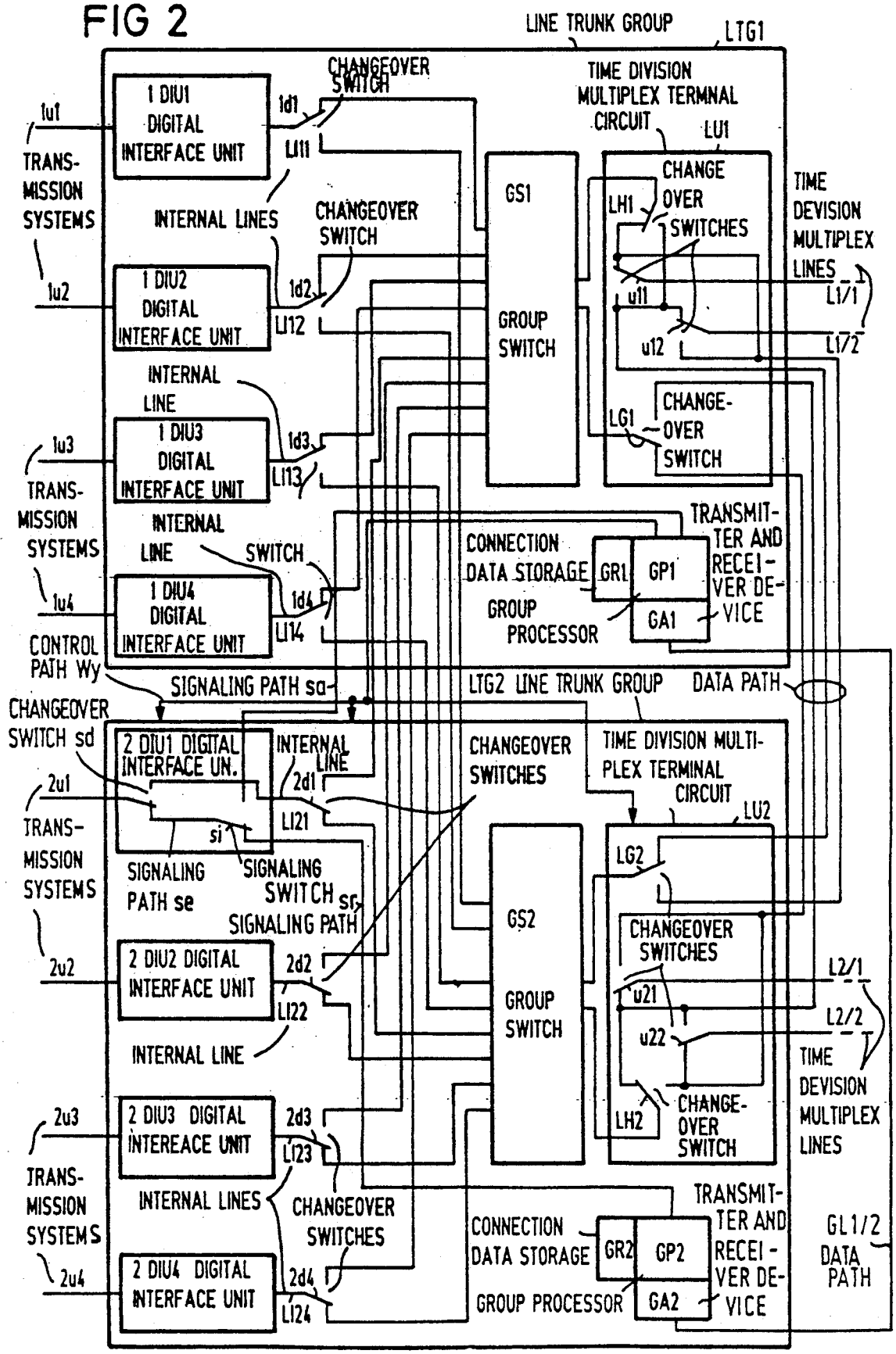
FIG. 2 is a block diagram which shows further details essential to the invention.

In this connection, namely completing the change-over to standby, further, a renewed change-over takes place within the line groups and, specifically, now within all line groups with the aid of the change-over contacts 1d1 to 2d4 shown in FIG. 2. Of these the change-over switches 2d1 to 2d4 which—as described above—at the beginning of the emergency operation had been brought from their idle position into their operating position, now return to their idle position, whereas the change-over switches 1d1 to 1d4 are brought from their idle position into the operating position. Subsequently, the switching operation is also continued with the help of those individual control units which up to the completed change-over to standby had been withdrawn from normal switching operation as well as via the assigned sub-switching network. Those individual control units and assigned sub-switching networks which up to the time of change-over to standby had continued the switching operation in emergency or quasi-emergency mode, the first become inoperative. But then, that central processor which, in connection with the change-over to standby, became operative establishes successively data links to all these individual control units which at the time of the completed change-over stopped operating first. Subsequently, the central processor loads the requisite program data and switching data also into the storage devices of these individual control units. This takes place dispersed in time in the normal switching processes. After the individual processor has loaded all of these individual control units with the required program information and the particular switching information, the mode in the line groups assigned to each other in pairs is successively again brought back from emergency to normal operation in that now also the change-over switches 1d1 to 1d4 are set back to their idle position.

After the specification of the embodiment of the invention shown as examples in the drawings has described a time division multiplex telephone exchange installation, in which the invention is applied, essentially in general context, it now addresses the connections essential to the invention in particular manner which relate to the change-overs of the connection devices of the line groups and their internal lines to the sub-switching network of the particular partner line group. Of special significance heretofore is the kind and manner of how these change-overs by means of the switches 1d1 to 2d4 (and potentially also by means of switches u11 to u22, see below!) are carried out, namely individually to each connection. They can serve the purpose of avoiding, in the above described manner, the failure of a traffic direction in the event that of one PCM transmission system representing a traffic direction none of its channels—due to a breakdown in the particular line groups—can be occupied. In this case the change-over can be limited to a single pair of line groups assigned to each other. These change-overs, however, can also, with respect to the number of participating line groups, be of greater extent, in particular affect all line groups. This applies preferentially for the processor change-over switching case.

As has already been explained for the preparation of a change-over to standby process it is provided that by that central processor, for example, the central processor ZW2, which in the change-over to standby process takes over the central processor functions instead of the other central processor, for example ZW1, via the central switching network, for example K2, assigned to the central processor taking over these functions, for example ZW2, data links to the individual control units, for example GP2, of all those line groups, for example LTG2 are individually connected-through, thus are brought into a ready state, in which with the aid of the change-over switches, for example 2d1 to 2d4 (see above!) the associated line units, for example 2DIU1 to 2DIU4, were changed over from sub-switching network, for example GS2, of this line group, for example LTG2 to sub-switching network, for example GS1, of the other line group, for example LTG1. Such change-over, hence, can be carried out in preparation for emergency operation due to breakdowns of the kind described above, thus solely for only a single line group pair (LTG1/LTG2) but it can also be carried out for the totality of the present pairs of line groups and, specifically, for the purpose of preparing the previously already extensively described change-over to standby of one of the central processors by the (in each instance) other central processor. As was also explained already in such change-over to standby also the change-over switches LH1, LH2, LG1, and LG2 are actuated. If the central processor ZW1 is operating, these change-over switches are in the position shown in FIG. 2. If the central processor ZW2 is in operation, in connection herewith the last mentioned change-over switches are brought into their (in each instance) other switching position. Thereby it is achieved that the sub-switching networks GS1 and GS2 instead of with the central switching network K1 are connected to the central switching network K2.

The described change-over can, thus, also affect line units, for example 2DIU1 to 2DIU4, of a line group, for example LTG2, in whose sub-switching network, for example GS2, or individual control system, for example GP2, or at any other location an operating failure has occurred, but can also affect all line groups in the event of processor change-over to standby. In this respect this change-over affects the connection paths, in FIG. 2, denoted by Li11 to Li24, between the line units and the outside sub-switching network connections. This change-over can, moreover, also be provided for the internal sub-switching network connections. In connection with such change-over, first with the change-over switches u11, u12, u21, and u22 also the connections between the sub-switching networks GS1 and GS2, on the one hand, and the time division multiplex lines L1/1 to L2/2, on the other hand, are changed over in a manner clearly evident in the drawing. These last-mentioned change-over switches are shown in FIG. 2 in that switching position which they assume in normal operation. If the change-over switches 2d1 to 2d4 are actuated and they separate the line units 2DUI1 to 2DIU4 from the external connections of the sub-switching network GS2 and connect them to the external connections of sub-switching network GS1, change-over switches u21 and u22 are also provided for the previously mentioned case that for the internal switching network connections a change-over is provided. They are then also actuated in line group LTG2. Thereby of the time division multiplex lines L2/1 and L2/2 which lead to the line group LTG2, the time division multiplex line, for example L2/1 in the time division multiplex terminal circuit LU2 belonging to this line group leading to the processor, for example ZW1 in operation at this time, is changed over with the effect that this time division multiplex line (L2/1) now, instead of to sub-switching network GS2 (via u21 break side and LH2 break side), is connected to sub-switching network GS1 (via u21 make side and LH1 break side), with it being determined in this operating case with the additional change-over switches LG1 whether or not this changed over connection becomes effective as a time division multiplex connection to the central switching network K1 or to the central switching network K2, in the just now addressed operating situation, thus, a connection to the central switching network K1. If a sub-switching network connections as well as also—in the case of the above described example—its internal sub-switching network connections. Through a change-over in a line group, for example LTG2, accordingly, its line units, for example 2DIU1, to 2DIU4, as sell as also its time division multiplex subscriber lines, for example L2/1 and L2/2 are changed over by the sub-switching network, for example GS2, of the particular line group, for example LTG2, to the sub-switching network, for example GS1, of the particular partner line group, for example LTG1. This change-over can, in the event of a breakdown, for the purpose of rendering ineffective the particular disturbance, be undertaken in a single line group pair for one of its two line groups or likewise in the case of several line groups affected by breakdowns, or for the purpose of preparing the above processor change-over to standby also simultaneously in all pairs of line groups. However, the possibility also exists of forming the telephone exchange installation in such a way that changing over affects only the line systems thus only their connection with the sub-switching network of their own line group or that of the particular partner line groups but not the connections of the internal sub-switching network connection to the time division multiplex subscriber lines L1/1 to L2/2. In this case the traffic which is handled via the partially changed-over line systems, for example 2DUI1 to 2DIU4, is conducted additionally via the time division multiplex subscriber lines, for example L1/1 of that line group, for example LTG1, to whose sub-switching network, for example GS1, this change-over took place. In this case it is best to proportion the time division multiplex subscriber lines as well as the sub-switching networks with respect to number of channels and through-connection possibilities so that the traffic which for a line group has been added in addition due to the change-over can be handled.

If the change-over—as indicated before and shown in FIG. 2—affects also the time division multiplex subscriber lines L1/1 to L2/2, it is advisable to proportion the sub-switching networks so that within them, sufficient through-connection paths are present, i.e. also in the situation in which change-over operation obtains.

As is further evident in FIGS. 1 and 2 of the drawing, to each of the individual control units GP1 and GP2 one connection data storage GR1 and GR2 is individually assigned. Furthermore, to each of these control units one transmitter and receiver device GA1 and GA2 is individually assigned. These are connected to each other via an individual data transmission path GL1/2. Via it the two individual control units can transmit to each other connection data with the mentioned transmitter and receiver devices. These can additionally also have the function of an intermediate storage in connection with the particular transmission processes.

It is now provided that each of the individual control units stores in its connection data storage device connection data regarding each existing connection through-connected from subscriber station to subscriber station. It can also be provided that also connection data of such connections are stored which are still in the state of establishing the connection, or also only such connections which have already been through-connected from subscriber station to subscriber station, in which the called party, however, has not yet answered.

The connection data, which are stored in the connection data storage device, indicate with respect to the individual connection existing via the assigned sub-switching network which external sub-switching network line is connected with which internal sub-switching network line. The "assigned" sub-switching network is always that which belongs to the same line group as the particular individual control unit and its connection data storage. Since a connection through-connected from one subscriber station to another subscriber station always runs through one sub-switching network, also the particular central switching network and again a sub-switching network, the to one connection through-connected from one subscriber station to another subscriber station always belong two connections in each instance within one or one each sub-switching network. These connections can also be referred to as "sub-connections". It is, thus, provided that in normal switching operation in each line group the connection data of those connections are stored which run through the particular sub-switching network.

It can, moreover, be provided that the individual control units which belong to a pair of lien groups transmit to each other the connection data of all newly through-connected connections. The connection data of all connections which are through-connected, for example via the sub-switching network GS2, are then transmitted by the individual control unit GP2 from its connection data storage GR2 to the individual control unit GP1 and conversely. The latter now stores the connection data received from its partner control unit also in its particular connection data storage and, furthermore, switches each individual control unit on the basis of the connection data received from its partner control unit additional connections ("sub-connections"

see above!) within that sub-switching network which along with it belongs to the same line group.

Provisions can be made in this connection that the connection data are transmitted from each of the two individual control units in the current switching operation to the particular partner control unit and that each of the two individual control units, due to these connection data, establishes continuously the particular sub-connections. Similarly, it can also be provided that each of the two individual control units by itself stores the connection data relating to the sub-switching network assigned to it, and that these are continuously transmitted from each of the two individual control units in each instance to its partner control unit and that each of the two individual control units, due to these stored transmitted connection data and due to a change-over preparation signal establishes the particular sub-connection.

In this manner, thus, in normal switching operation in each sub-switching network those connections can be through-connected from subscriber station to subscriber station, via which the particular subscribers communicated, are lead, as well as also those connections between external and internal sub-switching network connections which in normal switching operation are still unused. These connections extend from external sub-switching network connections, for example of the sub-switching network GS1, which are connected in the (in each instance) other line group, for example LTG2, via internal lines, for example Li, to the make sides of the particular change-over switches, for example 2d1 to 2d4, to internal sub-switching network connections which are connected via the change-over switches LG1 or LG2 to the make sides of change-over switches u21 and u22 or u11 and u12. All of these change-over switches are best designed as electronically operating switches in known manner.

If now from a line group the individual control unit and the sub-switching network is taken out of operation, then in the course of the change-over bringing this about the line units of the line group, for example 2DUI1 to 2DIU4, and possibly also the time division multiplex subscriber lines, for example L2/1 and L2/2 which lead from this line group to the central (duplicated) switching network are changed over with the described change-over switch, for example 2d1 to 2d4 and possibly also u21 and u22, to the sub-switching network of the particular partner line group. Since in this connection, in the manner described above, it is provided that between external and internal sub-switching network connections the already previously described sub-switching network connections ("sub-connections" see above!), which up to this time were unused, are established preparatorily, it is hereby achieved that in the course of a change-over of the last described kind of connections which are already through-connected from subscriber station to subscriber station do not need to be disconnected. To this end, in normal switching operation from each of the two individual control units, which belong to a pair of line groups, via individual transmission paths specific to the pairs of line groups, connection data are transmitted to the corresponding partner control unit. Each of the two individual control units establishes on the basis of these transmitted connection data received by it connections via the sub-switching network of the (in each instance) assigned line group, and, specifically to the external sub-switching network connection with which upon a change-over the line units of a first line group can be connected to the sub-switching network of a second line group of the particular partner line group through the change-over to standby.

The features particularly essential of the herein described embodiment example relate to the various processes of change-over to standby of the connection device of a line group or—as explained—a plurality of line groups, in particular each second line group. It is of particular significance that connections which are in the process of being established which are affected by a change-over do not need to be disconnected. This process of setting up extends all the way from the time the handset is taken off at the subscriber station of a calling subscriber (closing the particular subscriber line loop) to the point at which the called party answers. Since in this process of establishing a connection the sub-control systems of the line groups through which the new connection runs, as well as the central processor, participate, and since between these run different data exchange and control processes, they may not be disturbed in any change-over. It can therefore be provided that the internal lines, for example Li11, within a line group leading from a line system, for example 1DIU1, within a line group, for example LTG1, to its sub-switching network, for example GS1, can be changed over within one rerouting phase singly, i.e. specific to the connection to the sub-switching network, for example GS2, of the (in each instance) other line group, for example LTG2. To this end, as explained above, the mentioned change-over switches 1d1 to 2d4 are formed as electronically operating switches.

As was also explained above, the lines L1/1 to L2/2 are time division multiplex subscriber lines. The invention, however, is not limited to this, but can also be applied to a telephone exchange in which all lines and all through-connect paths in the sub-switching networks, for example GS1, as well as in the central switching network, for example K1, have been realized according to the principle of space division. Since—as indicated above—the invention provides that the internal lines Li11 to Li24 within a line group leading from a line system within a line group to its sub-switching network can be changed over within a rerouting phase singly, i.e. specific to the connection to the sub-switching network of the (in each instance) other line group this refers to the last mentioned application case of a telephone exchange according to the space division principle as well as also to the application extensively described before, namely that the exchange is realized in PCM technology according to the time division multiplex principle. Thus, what was stated with respect to the internal lines, applies for internal lines specific to the connection according to the space division multiplex principle, as well as in corresponding manner for time division multiplex channels, which lead always with several in common via one and the same transmission path, hence, have a common transmission medium. In the latter case the change-over switches 1d1 to 2d4 and the change-over switches u11 to u22 function according to the time division multiplex principle, in which they in known manner either change over each of the particular channels singly or first still leave unchanged and conversely. These change-over switches are driven in a manner known per se by the sub-control system of that lien group from which or to which the intended change-over takes place. It may, thus, be provided that this change-over takes place channel-specific, that the change-over switches are controlled channel-specifically according to the time division multiplex principle.

It may, furthermore, be provided here that within this rerouting phase, carrying out change-overs is restricted to those internal lines which are not busy, respectively which are becoming free, for example, through connection release, preferably to these as well as additionally such internal lines, in which the processes of establishing connection have been completed, the same called party, however, has not yet answered. This avoids that change-overs in connections take place in their particular build-up phase. Here, the possibility exists of restricting the change-overs generally completely to the unoccupied internal lines. Such operating mechanism brings about that in addition to connections in the process ob being established also those already completely through-connected remain untouched by change-overs. In this case the entire process of change-over switching extends to a change-over phase which runs up to a point at which also the last connection which at the beginning of the change-over process already existed or was only in the process of being established is completed, thus is again released by the particular calling subscriber. The time required for this change-over phase can be shortened if it is accepted in the bargain that a small percentage of long-time connections is by necessity subjected to a connection release through a termination in the exchange.

It can also be provided that in change-over switching not only the non-occupied but also those connections are included in which the called party has already answered. This shortens the time requirement for the change-over considerably.

Likewise, however, in the herein described connection, carrying out the change-over processes can be limited to the unoccupied as well as additionally to those internal lines in which the processes of establishing a connection are already completed, the particular called party, however, has not yet answered. These are, thus, connections which are in the ringing phase. In this case, after beginning a change-over phase, change-over switching takes place initially for all non-occupied internal lines and, subsequently, for all internal lines which are occupied by connections which are in the ringing phase or in reverse sequence or without a particular sequence of this nature. During the further course of the rerouting phase, additional change-overs for internal lines occur which, during a connection setup taking place via it are becoming free (for example, due to sudden connection release through the calling subscriber), as well as for internal lines via which connections have been setup which enter the ringing phase. Change-over switching is then undertaken for internal lines through which connections are through-connected, in which the called party has already answered as well as also those internal lines which are not busy and those that are being freed. These change-overs can be carried out immediately. They can also be carried out largely immediately, however, for connections in the process of being established immediately individually subsequently or collected subsequently at the end of the rerouting phase. All of these change-overs in one of two line groups assigned pairwise to each other are controlled by the peripheral control unit of the line group by from which the change-overs to the partner line group occur, or by the peripheral control unit of the partner line group.

Carrying out the change-overs, for example, in the line group LTG2 takes place, thus, by means of the peripheral control units, for example GP1, in the manner that the peripheral control unit of one line group carries out the change-over in its own or in the particular other line group. To this end, appropriate control paths are provided, for example Wy (or corresponding ones in the case of control of the change-overs by its, in each instance, own peripheral control unit), between, on the one hand, each of the peripheral control units, for example GP1, each of the line groups, and, on the other hand, the change-over switches, for example 2d1-2d4, in the particular other line group, for example GP2. Via these control paths the additionally shown change-over switches u21 and u22, also LG2, LH2 are also controllable. All connection paths can be conventionally designed in space division multiplex technology but they can also be realized in time division multiplex technology. In this case the internal lines Li11 to Li24 as well as the change-over switches 1d1 to 2d4 are operated in a manner known in time division multiplex technology in such manner that corresponding connection-individual channels can be changed over singly, i.e. connection-individually in the described manner.

Change-over switching takes place in a time-defined change-over phase. The time for a change-over phase can be given and can be defined by means of a time meter, not shown. If this time is not fixed in this manner, and not limited by means of a time meter, it is limited in other ways, and specifically in that subscribers dialing connections are monitored in a manner known per se in their dialing activity. Subscribers who wait too long in starting to dial or insert pauses that are too long between dial numbers, receive busy signals and their connection setup is interrupted perforce, with the potentially already partially established connection being released again. To this end, in a manner known per se, time metering dialing monitor devices are provided in telephone switching installation of the herein described type.

As has been described, the explained change-overs can function for the purpose of switching over in the event of an operating failure in a line group, for example at its individual control (GP), or at its sub-switching network (GS), or also at its time division multiplex connection lines (L1/1 to L2/2) leading to the central switching network, the connection-group internal lines (Li . . . ) which in this line group lead from its line systems to external sub-switching network connections of its sub-switching network—and hence these line systems themselves—from these sub-switching network connections to those of the particular partner line group. Therewith, connection paths, which come from other exchanges and which are connected to these line systems, can remain in operation in that for them possibilities for through-connections are available, which exist via the sub-switching network of the particular partner line group. In the process—as has also been explained already—the time division multiplex subscriber lines, for example L2/1 and L2/2, can also be changed over with the change-over switch LG2 and LH2; this is, of course, only meaningful if the occurring operation disturbance does not lie in these time division multiplex subscriber lines.

If a change-over is being carried out due to an operating breakdown in a line group then only the two line groups assigned in pairs to each other are subjected to the particular switching measures. First, the internal lines are connection-individually switched over in the described manner according to the time division multiplex principle. If the particular operating breakdown is again eliminated, switching back the internal lines takes place. This best takes place according to the same rules as they are described in detail above for the change-over switching processing upon the occurrence of an operating breakdown.

As was explained above, the described change-overs can also serve the purpose of preparing a processor change-over to standby. In this case change-over switching initially takes place for all pairs of line groups likewise in the described way.

After change-over switching in this manner has been completed for all line groups, and specifically in preparation for change-over to standby, the always only one individual control unit in each of the pairs of line groups functions, for example GP1, and a sub-switching network, for example GS1, for handling the switching operation of both line groups. In this exemplary operation, the change-over switches 2d1 to 2d4 and u21 to u22 are in their operating position. It was further assumed above that, for the exemplary case of a processor change-over switching to standby, the switching operation initially is still being handled with central processor ZW1 still via the central switching network K1. For that reason the change-over switches LH1, LH2, LG1, LG2 are still in their shown idle position. In this operating condition—as is evident from FIG. 2—due to the change-over that has taken place, the time division multiplex line L2/1 of the line group LTG2 via the make side of change-over switch u21 and the break side of change-over switch LG1 is connected to the sub-switching network GS1 of line group LTG1.

In addition, in this situation, the time division multiplex line L2/2 is connected via the make side of change-over switch u22 and the break side of change-over switch LH2 in the time division multiplex terminal circuit LU2 to the sub-switching network GS2 of the same line group and is through it or through a line brought to it directly from this time division multiplex terminal circuit connectable to the individual control unit GP2. Through this path, in preparation for the impending change-over to standby described more extensively above, the data loading process for program information and switching information for these control units takes place.

As explained, after these change-overs, loading of all individual control units, or loading of their storage devices which had been temporarily withdrawn from switching operation through the change-over switching, takes place. If in the switching processes—as described—the change-over switches 2d1 to 2d4 and u21 and u22 had been activated (connection-individually) and if until now the processor ZW1 had been in operation, then for the control unit GP2, the data path for this loading is given via the make side of change-over switch u22 and the break side of change-over switch LH2 (see above!). Now, analogously to the totality of the switched-through connections, in the line groups which had been in operation until then (for example LTG1) and the central switching network (for example K1) which had been in operation until that point, by way of preparation, parallel connections are set up via the other switching network (for example K2) and the other line groups (for example LTG2), and specifically, with their individual control units (for example GP2) as well as with the other processor (for example ZW2).

In each pair of line groups, the change-over switches which had previously been actuated in the change-over switching processes, for example 2d1 to 2d4 and u21/u22, are subsequently set back to their idle position, and the other change-over switches, for example 1d1 to 1d4 and u11/u12, are brought to their operating position. This takes place in accordance with the same previously described principle of connection-individual change-over of the internal lines. Likewise, the change-over switches LH1, LG1, LH2, and LG2 are switched from their idle position to their operating position, whereby the time division multiplex subscriber lines L1/1 to L2/2 are so switched over that the switching network K1 as well as also the processor ZW1 are changed over to standby through the switching network K2 and the processor ZW2. Subsequently, all connections run via the (in each instance) other line groups, for example LTG2, and its sub-switching networks, for example GS2, as well as via the switching network K2. In this operating situation, consequently, connections which are connected through via the line systems 1DIU1 to 1DIU4 run via the make sides of change-over switches 1d1 to 1d4 and via the sub-switching network GS2.

Following the previously described processor change-over switching with the switching of all connections to the other central switching network (for example K2) and (in each instance) to the other sub-switching networks (for example GS2) the particular processor (for example ZW2) undertakes the reloading mentioned above of those individual control systems (for example GP1) which had just been taken out of switching operations through this change-over switching. After that again change-over switching of connections takes place in the manner according to the invention, i.e. connection-individual change-over switching of the internal lines (for example Li11 to Li14), for those line systems (for example 1DIU1 to 1DIU4) through which the connections are through-connected, which run via the sub-switching network (for example GS2) of the (in each instance) other line group (for example LTG2). These connections are then switched back again to the sub-switching network (for example GS1) of that line group to which the previously mentioned line systems belong.

Lastly, the case should be dealt with that to the line systems, for example 1DIU1, outside of establishing the connection via other exchanges PCM transmission systems are connected, for example with 24 or 30 channel pairs each, of which always one channel pair can be occupied to establish an individual connection. In such transmission systems one channel pair functions in known manner for transmitting channel-individual signaling data. In this connection the RECOMMENDATIONS G704 in the Rot-Buch of the CCITT, VIII, Plenary Assembly in Malaga-Torremolinos, Oct. 8–19, 1984, Fascile III. 3, (pages 77 to 79) provide through the signaling system known as CAS system, to form within each of a continuous sequence of pulse frames continuously bit sequences of 8 bits each, of which each is referred to as a "word". There are 32 words in each pulse frame of which 30 are assigned singly to 30 channels. An additional word for each pulse frame functions to transmit channel-individual signaling data and, specifically always one halfword for each channel. Accordingly, 16 pulse frames are combined to form one super pulse frame, whereby 32 halfwords for each super pulse frame are available, of which 30 halfwords are fixedly assigned to the 30 channels for transmitting signaling data.

The description up to this point refers primarily to connection setups and, specifically, to the subscriber/-subscriber connection. It is, however, known that each such connection is accompanied by signaling data specific to the connection, as can be found in the last cited literature reference and also in DE-OS 31 22 275. It is not intended to provide in a manner similar to change-over switches 1d1 to 2d4 additional signaling change-over switches (si), shown only once (in 2DIU1) representative for all line systems in FIG. 2 for each line system, which signaling paths through-connect from each of the line systems (2DIU1) of a line group (LTG2) to the individual control system (GP2) in normal operation (via sr), and which similarly to change-over switches 1d1 to 2d4 can be switched over connection-individually, i.e. in this case channel-individually, and, specifically, in a manner corresponding to that of change-over switches 1d1 to 2d4 in order to supply in time division multiplex technology the signaling data associated with each connection in the course of a rerouting process during a rerouting phase to the individual control system GP2 or the individual control system GP1 (via sa) or in order to receive signaling data individual to the connection from there in the particular line system. These signaling change-over switches are, thus, brought in time division multiplex technology by the particular individual control unit, for example GP1, into its (shown) idle position and operating position, depending on to which of the two participating control units, for example GP1 or GP2, the particular halfword of the particular signaling data is to be transferred, which is determined on the basis of to which of the two line groups, for example LTG1 or LTG2, the particular channel in the sense of the above description is assigned from the aspect of control technology.

In contrast to the CAS system through the CCITT recommendation Q.702 in the same Rot-Buch (Fascile VI. 7, pages 17) a signaling system known as CCS system has been suggested. According to it suggestions are made to depart from the rigid assignment of signaling halfwords to channels occupiable by connections and, instead, to form signaling data of greater extent and to handle assignment to particular channels with corresponding addressing. Assuming application of this signaling principle it is provided to control two line groups in such a way that their individual control unit at the time when it receives signaling data for a channel, which in the already described manner through change-over switching also in terms of control is assigned to the other line group, routes the particular signaling data according to this assignment to this other line group (for example via path GL1/2 or a path similar to that from GP1 to GP2 and conversely) and in it supplies it, subsequently, to the particular individual control unit for further transfer and/or further processing.

Up to this point the specification has represented the change-over processes in terms of their connection-individual property, i.e. in the operational manner that each connection depending on the state of progression of the connection setup achieved in each instance was switched over, as well as each free connection path which is occupiable connection-individually; the assumption was always made that, on the one hand, the message path (see below) associated with a connection or with a connection path, for example, voice wires or message channel, and, on the other hand, the signaling path associated with it (see below!), for example, signal wires (space division multiplex switching technology) or connection-individual signaling channel, are always changed over simultaneously which preferably can be realized in time division multiplex technology. Subsequently, in accordance with this one variant, these change-overs take place singly for each connection path, for example, for each connection-individually occupiable PCM channel, thus in common for the connection-individual message path belonging to the particular connection path plus signaling path. Subsequently, another variant will be dealt with which has partially identical and partially deviating features in comparison to the variants described so far.

In general, each connection path made available for individual connections and, accordingly, occupiable has a connection-individual message path as well as a connection-individual signaling path. The connection-individual message path functions for the transmission of voice information, data, and the like in the sense of the subscribers who to this end dial appropriate connections, and who intend via it to communicate with each other, to exchange data and the like. The connection-individual signaling path belonging singly to a connection-individual message path of this type functions for switching signals and their transmission and exchange in known manner for the purpose of setting up connections, maintaining connections, as well as charge accounting and the like. In conventional telephone switching installations the connection-individual message path consists of the voice wires and the connection-individual signaling path of occupied wires and signal wires for forward signals and backward signals (c- d-, e-, and f-wire). In telephone switching installations in time division multiplex technology signaling data for transmission and for exchanging such switching signals are transmitted in the manner described previously according to the principles of the CCITT recommendations.

The previously addressed other variant provided in similar form as the first variant described prior to it in great detail, that the line group-internal lines Li11 to Li24 leading from a connection device within a line group to a sub-switching network can likewise be switched over to the sub-switching network of the particular partner line group. This applies very generally with respect to both described variants.

Furthermore, in the addressed other variants also—as already described for the first ("one") variant elucidated earlier in great detail—provisions are made that in preparation for a potential change-over switch of the internal lines from the sub-switching network of the one line group to the sub-switching network of its partner line group, generally each of the particular two control units, on the one hand, outputs connection data, which with respect to all message path sub-connections existing via its sub-switching network indicate which external sub-switching network is connected in each instance with which internal sub-switching network connection, from it via peripheral transmission paths in each of the line group pairs to the corresponding partner-control unit and, on the other hand, in conjunction with such received connection data sets up individual message path sub-connections via the sub-switching network of its own line group. This takes place in a manner very similar to that already described in connection with the above first variant. These message path sub-connections are, hence, established in conjunction with received connection data. It has already been pointed out that for an exchange of these connection data between the control units of a line group pair peripheral data paths GL1/2 are provided.

Said message path sub-connections which are set up on the basis of such received connection data, are established between the already cited internal sub-switching network connections and external sub-switching network connections (to the right of GS1 or to its left). These are such external sub-switching network connections with which the internal lines of the particular partner line group are connectable through change-over switching; further, these are such internal sub-switching network connections with which the internal lines of the particular partner line group can be connected through this change-over via the last mentioned external sub-switching network connections and message path sub-connections. These message path sub-connections are connections established as a precaution and in preparation as possible replacement for existing connections in a sub-switching network or those in the process of being set up, with the particular corresponding message path sub-connections established as a precaution and in preparation are always established in the sub-switching network of the particular partner line group.

According to the addressed other variants, the internal lines Li11 to Li24 carry expressly only the already cited message paths; the internal lines are all changed over within a rerouting phase without delay for which purpose the preparatorily and precautionarily (thus, before the beginning of a rerouting phase) set up message path sub-connections in the sub-switching network of the particular partner line group are already available. According to the addressed other variants in comparison to the above first variant of the signaling paths which in a manner known per se lead within each line group to their control unit, only those of those connection paths which are free or become free, for example through connection release, are switched over in the same way from their own control unit to that of the partner line group. This takes place with the aid of the change-over switches si already cited above. In the same manner such switches (not shown) are provided in all line units. It has already been explained that this change-over switch is formed as an electronically operating switch and is controlled in time division multiplex technology. Via this change-over switch extend, in the sense of time division multiplex technology, all connection-individual message paths and those signaling paths assigned to connection-individually occupiable signaling paths of the particular connection device. This change-over switch is controlled in time division multiplex technology in such a way that, via it for each connection-individual channel, thus for each connection-individually occupiable message path, the particular associated signaling data from and to the peripheral control system of its own line group or from and to the peripheral control system of the partner line group is routed. This change-over switch is so controlled in time division multiplex technology that, through it is thereby effected that of the signaling paths only those of those connection-individually occupiable connection paths are changed over which are free or become free as well as—preferably—also of those connection paths via which connections between subscribers due to the answer of the particular called party are completely through-connected, as well as also of those connection paths in which the connection set up processor are completed the particular called party, however, has not yet answered. With the completion of the rerouting phase it is also provided in the case of the addressed other variants that at this point in time connections potentially still in the process of being set up are released.

According to the addressed other variants, the connection-individually occupiable message paths are controlled differently with respect to the change-over switching processes to be carried out and the change-over switches provided therefore than the particular associated signaling paths. The message paths are all immediately changed over in change-over switching. The signaling paths, in contrast, are partially changed over only somewhat later under consideration of connection setup processes potentially at the time currently in progress. To this end, the change-over switch si is controlled in time division multiplex technology from the particular peripheral control unit in such a way that it always assumed in those time positions (or parts thereof) its operating position opposite the represented idle position which are assigned to the signaling channel time position of the connection paths in accordance with time position via which no connections run or such which are completely through-connected from subscriber to subscriber due to the fact that the particular called subscriber has answered; here such connections can also be included which are in the ringing phase (thus between dial end and answer) (see above!). This change-over switch is, in contrast, driven into its (shown) idle position in signaling channel time position from such connection paths via which connections are in the process of being set up. The time division multiplex control of change-over switch si in the connection device 2DUI1 of the line group LTG2 takes place from its peripheral control unit GP2 with which the connections via connection devices 2DIU1 to 2DIU4 of these line groups already and still in the process of being set up are being completed in terms of connection setup techniques. It would, however, also be possible to control the change-over switch si from the control unit of the particular partner line group.

In the case of the addressed other variants, it is also provided that internal lines as well as their signaling paths can be changed over form one line group to the other in said manner that subsequently, information relating to switching technology and/or program data are transmitted to the control unit of the one line group and stored there, that subsequently, the internal lines as well as signaling paths of both line groups can be changed over from the other line group to the one line group in said manner, that, subsequently, information relating to switching technology and/or program data are transmitted tot he control unit of the other line group, and there hereupon the internal lines as well as their signal paths of the one line group are switched back from the other line group again to the one line group in said manner.

Hereupon the possibility exists also, in the case of the addressed other variants, to complete reloading the peripheral control units with information relating to switching technology and/or program data by the central processor.

A further change-over switch (sd) is yet to be mentioned. It is also controlled in time division multiplex technology. In its shown idle position via it the PCM transmission path 2u1 to the peripheral control system GP2 is connected; in contrast, in its operating position it is connected with change-over switch 2d1. As is known per se, a PCM system (2d1) comprises message channels provided as message paths which can be occupied connection-individually as well as also a signaling channel common to them; in it transmission of halfwords is provided which in the super pulse frame are singly fixedly assigned to the message channels in accordance with time position. According to this time position assignment in the pulse frames and in the super pulse frames—and, specifically, of the message channels as well as also of the signaling channel halfwords to these frames—the described time division multiplex control of the change-over switch sd takes place. Corresponding change-over switches (corresponding to si and sd) are analogously also provided in the other connection devices of these as well as of all other line groups.

What we claim is:

1. A circuit configuration for centrally-controlled telephone switching installations comprising:
   a central switching network together with a central processor;
   a plurality of peripheral line groups equipped with one sub-switching network each for the external connection of connection and/or subscriber lines and with one peripheral control unit; wherein:
   the line groups are assigned to each other in pairs and mutually represent partner line groups;
   in each of these line group pairs, internal terminals of the sub-switching network associated with each partner is selectively switchably connected to the terminals of its central switching network and, via link lines, to the terminals of the central switching network and the internal terminals of the sub-switching network of the other partner;
   each of the line units of the line groups in a partner pair are alternatively switchably connected to the external terminals of their sub-switching network and, via internal lines, to the external terminals of the sub-switching network of the partner line group;
   whereupon for connections which extend via a line unit of a first partner of a pair of line groups and via the internal lines to the sub-switching network of the second line group of the pair, appropriate switching signal processing as well as sub-switching network setting may be carried out by the control unit of the second line group of the pair;
   the connection circuits of the network each support a message channel and a signal channel;
   in preparation for shunting a lien unit to a partner's sub-switching network via an internal line, each of the two control units outputs connection data which, with respect to all message path sub-connections existing via its particular sub-switching network, indicates which external sub-switching network connections are connected with which internal sub-switching network connections to a particular partner control unit and, in conjunction with such received connection data, establishes individual message path sub-connections via the sub-switching network of its own line group, and, specifically, between such sub-switching network connections with which the internal lines of the particular partner line group are connectable through shunting a line unit, and such sub-switching network connections which through this shunting the link lines of the particular partner line group are to be connected via the external sub-switching network connections and message path sub-connection;
   the internal lines carry only a message channel and within one rerouting phase are all changed over without delay
   in contrast to the signaling paths which lead within each line group to their control unit and only those connection paths which are free are switched over from their control unit to the partner line group as well as those connections paths via which connections between subscribers are completely through-connected due to the particular called party having answered.

2. The circuit configuration as stated in claim 1, wherein:
   the internal lines as well as their signaling paths can be switched from one line group to a partner group prior to the transmission of information relating to switching and/or program data to the control unit of the one line group and storage therein;
   subsequently, the internal lines as well as the signaling paths of both line groups can be changed over from the partner line group to the one line group in the stated manner;
   subsequently, information relating to switching technology and/or program data are transmitted to the control unit of the partner line group; and
   the internal lines as well as their signal paths of the one line group are switched back from the partner line group again to the one line group in the stated manner.

3. The circuit configuration as stated in claim 1, wherein within one rerouting phase, the signaling paths of those connection paths are also changed over in which the connection setup processes are completed the particular called subscriber has, however, not yet answered.

4. The circuit configuration as stated in claim 1, wherein with the completion of the rerouting phase, the connections which at this point in time are still in the process of being set up are released.

* * * * *